Nov. 28, 1967  G. HESSE ET AL  3,355,603
HOLLOW BODIES OF ELECTROSTRICTIVE MATERIAL
Filed April 13, 1965  3 Sheets-Sheet 1

Inventors
Wieland Diehl
Gerhard Hesse

Nov. 28, 1967 G. HESSE ET AL 3,355,603
HOLLOW BODIES OF ELECTROSTRICTIVE MATERIAL
Filed April 13, 1965 3 Sheets-Sheet 3

Inventors
Gerhard Hesse
Wieland Dietel

United States Patent Office 3,355,603
Patented Nov. 28, 1967

3,355,603
HOLLOW BODIES OF ELECTROSTRICTIVE
MATERIAL
Gerhard Hesse and Wieland Dietel, Jena, Germany,
assignor to VEB Carl Zeiss Jena, Jena, Germany
Filed Apr. 13, 1965, Ser. No. 447,920
11 Claims. (Cl. 310—9.7)

ABSTRACT OF THE DISCLOSURE

A hollow body of electrostrictive material has two apertures and on its inner and its outer surface electrically conductive layers. At least one of said layers having a maximum and a minimum extension parallel to the straight line interconnecting the centers of said apertures. By means of said device small changes in distance of the aperture centers of said hollow body can be accomplished.

Figure 1:
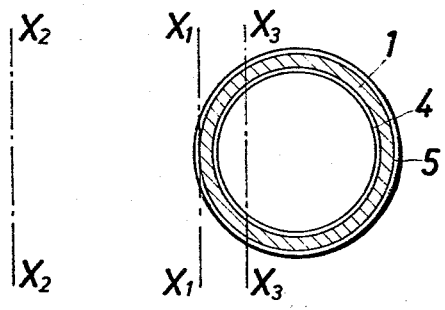

This invention relates to a hollow body of electrostrictive material for precision-optical measurements and particularly for tuning and/or adjusting Fabry-Perot resonators which has two diametrically opposite apertures and on its inner and its outer surface at least one electrically conductive layer each and to which is connected at least one plate for covering one of its apertures.

Quick-registering Fabry-Perot interferometers are known in which the spacing of the plates is magnetostrictively or electrostrictively varied by means of appropriate oscillators. In these interferometers, inertia forces inherent in oscillation cause flexures of the Fabry-Perot plates and thus uncontrollably impair proper functioning, another disadvantage being that interior friction transforms part of the oscillation energy into heat and thus works changes in the spacing between the Fabry-Perot plates. Interferometers of this kind are accordingly unfit for precision measuring.

In a known Fabry-Perot resonator at least one of the two plates is fixed to a hollow body of electrostrictive material made up of two rings interconnected by webs. The disadvantage of this resonator consists in that the preferably cylindric hollow body must needs be subjected to special treatment before being ready for use as a resonator.

The present invention aims at overcoming the foregoing disadvantages and has for an object the provision of an electrostrictive hollow body which is easy to manufacture and lends itself to a great variety of purposes. The use of this hollow body in a Fabry-Perot resonator guarantees air-tight connection of the plates to the hollow body and correct tuning and adjustment of the resonator.

To this end the present invention consists in a hollow body of electrostrictive material which has two diametrically opposed apertures and on its inner and its outer surface at least one electrically conductive layer each and to which is connected at least one plate for covering one of the apertures, characterized in that the layers extend over the entire circumference of the hollow body and that at least one of these layers has at least one maximum and one minimum extent parallel to the generatrix of the hollow body. When different voltages are applied to the layers, the hollow body along its circumference undergoes different deformations in extension parallel to the generatrix, these deformations being greatest at maximum and smallest at minimum extension. Depending on these deformations in extension, the plate or plates connected to the hollow body are displaced at right angles to themselves and tilted about an axis lying in the plane of the respective aperture in the hollow body. If the layer at the minimum still extends parallel to the generatrix, the tilting axis lies outside the circumference of the hollow body. If there is no such minimum deformation in extension, the tilting axis is tangential to the circumference. If the intended special use of the hollow body requires the plate to be a mirror, a semi-transparent mirror, a transparent element or a holding device, tiltable about an axis traversing the circumference of the aperture of the hollow body, it is advantageous that at least one of the layers has two maximum extents and two minimum extents parallel to the generatrix, the maximum extent being proportional to the shortest circumferential arc between the two minimums over which the maximum bulges. The plate is tilted about a diameter of the aperture of the hollow body when the maximums are equal to each other and receive electric voltages which are inversely equal to each other in respect of the voltage of the layer without extreme values. The directions of the resulting electric fields between the layers are respectively parallel and antiparallel to the direction of the polarization of the hollow body.

One of the layers on the shell of the hollow body can be divided into partial layers, each partial layer having a maximum and a minimum and all partial layers being staggered relatively to each other along the circumference. It is irrelevant into how many parts the layer on the interior and/or that on the exterior surface are divided. The layer may for example be subdivided into three equal partial layers staggered 120° and extending over the entire circumference of the hollow body. If the distance apart of the centers of the two apertures is to remain unchanged when the hollow body is being electrostrictively adjusted, it is advisable to provide two partial layers staggered advantageously 90° on the circumference and having each two equal maximums and two equal minimums.

That surface of the hollow body which bears the layer having extreme values can along its entire circumference be lined with another layer of equal breadth. When using the hollow body in a Fabry-Perot resonator it is possible by means of the layer having extreme values to change the angle, and by means of the layer extending at equal breadth over the entire circumference to change the spacing between the Fabry-Perot plates.

If the cross-sectional area of the hollow body is circular, the area of the layer with extreme values is distributed sinusoidally. To keep the hollow body as short as possible, it is advantageous in this case to fit the partial layers into one another in such a manner that their boundaries near the apertures are straight lines and that their boundaries between these straight lines are sinusoidal lines. The partial layers are separated from each other by layer-less strips of approximately equal breadth. These strips must be broad enough to exclude the possibility of any of them being deformed to the detriment of the desired correlation of the Fabry-Perot plates when an electric field is applied. In the interest of a further shortening of the shell of the hollow body, the partial layers instead of lying side by side can be placed above one another with insulating layers in between, in which case the partial layer farthest from the shell is to receive voltage a little higher than that applied to the layer nearest the shell. However, such a spread of the layers requires a special switching arrangement.

This invention also applies to hollow bodies which are not of electrostrictive material over their entire length and are lined accordingly, or to hollow bodies the electrically conductive layers of which do not cover their entire length.

To ensure exact functioning of the hollow body according to the invention, the shell must be so lined and the respective layers so stressed by electric voltages that the extension of the shell parallel to the generatrix takes place without any jog. Thus, the plates sprung on or cemented or otherwise fixed to the hollow body are not bent and do not come loose.

The hollow body according to the invention is particularly suitable for high-precision measurement and for obtaining maximum coherence lengths. It can be used in highly resolving spectrometers or as an optical filter for producing extremely monochromatic radiation having a definite wave-length concentration point. It is also useful in optical amplifiers, because it greatly simplifies their tuning and shortens their length. The spread of the layers for electrical field distribution on the shell of the electrostrictive hollow body permits tuning the optical amplifier without closure of the active medium because the amplifier can be hermetically sealed by the Fabry-Perot plates and can itself receive the active medium.

Figure 14:
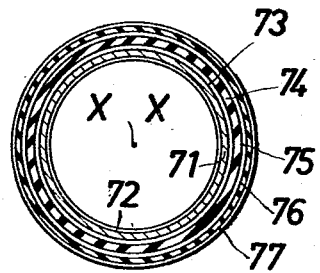

In order that the invention may be more readily understood, reference is made to the accompanying drawings which illustrate diagrammatically and by way of example eight embodiments of the invention, the hollow body illustrated being of the simplest form possible. In these drawings, FIG. 1 shows the cross section of a cylinder, FIGS. 2, 4, 6, 8, 9 and 10 show developed cylinder shells lined with different layers, FIGS. 3, 5 and 7 are side views of the cylinder shells shown respectively in FIGS. 2, 4 and 6, FIG. 11 shows a longitudinal section of a Fabry-Perot resonator, FIG. 12 shows the exterior layer on a Fabry-Perot resonator, FIG. 13 is a switching diagram illustrating the manner in which the electrostrictive cylinder shell is influenced, and FIG. 14 shows a cylinder shell in a section at right angles to its geometrical axis.

Figure 2:
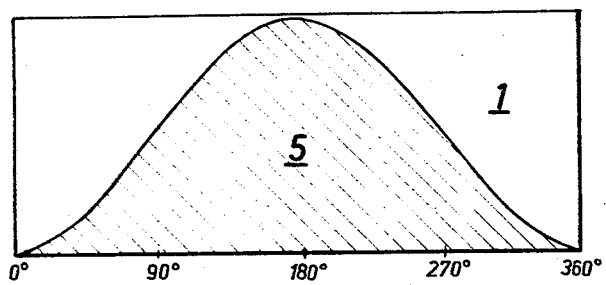
Figure 3:
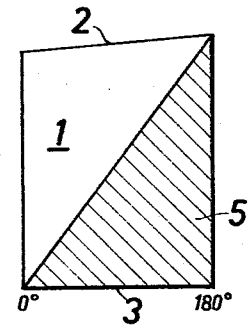

In FIGS. 1 to 3, the shell 1 of a circular cylinder having apertures 2 and 3 has its interior side entirely lined with an electrically conductive layer 4 and has its exterior side lined with a sinusoidally spread electric conductive layer 5. If two different voltages are respectively applied to the interior and the exterior layer, the shell 1 is subjected to a deformation in extension (strongly exaggerated in the drawing which has its minimum at 0°, or 360°, and its maximum at 180° of the circumferential angle, according to the sinusoidal spread of the layer 5. If the aperture 2 is closed by a plate (not shown), this plate is tilted about an axis $X_1-X_1$ which touches the shell 1 at 0°.

In FIGS. 4 to 10 only those layers are shown which by their shapes cause deformations in the extension of the hollow body of electrostrictive material.

Figure 4:
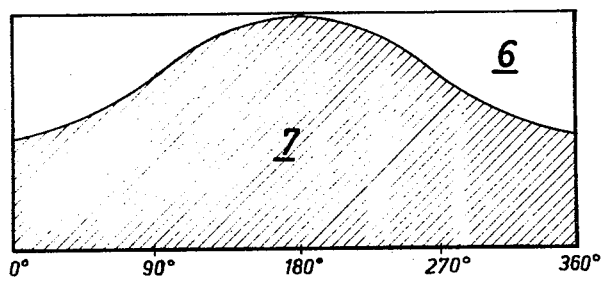
Figure 5:
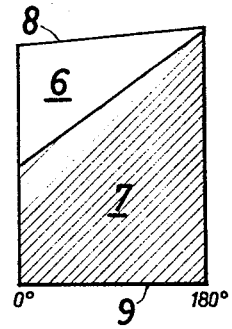

In FIGS. 4 and 5, a cylinder shell 6 is lined inside (not visible) and outside with a layer 7 the minimum extent of which differs from zero at 0°, or 360°, of the circumferential angle. The apertures of the cylinder are designated 8 and 9. When electric voltages are applied, the cylinder is deformed in extension parallel to its generatrix, this extension having its minimum at 0°, or 360°, and its maximum at 180°. Owing to the spread of the layers, which differs from that in FIGS. 2 and 3, the minimum cylinder extension varies from zero and is positive. Assuming the aperture 8 to be closed by a plate, the electrostrictive extension of the cylinder causes this plate to tilt about an axis $X_2-X_2$ lying outside the cross-sectional area of the cylinder (FIG. 1).

Figure 6:
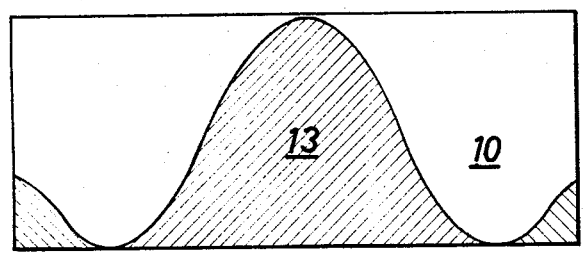
Figure 7:
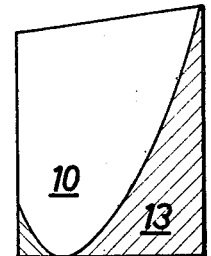

FIGS. 6 and 7 show the shell 10 of a cylinder having two apertures 11 and 12 and a layer on either side, only the exterior layer 13 being visible. The layer 13 has two unequal maximums respectively at 0° and 180° and two equal minimums respectively at 60° and 300° of the circumferential angle, the extent of the layer 13 parallel to the generatrix being zero at these minimums. The extent of the maximums parallel to the generatrix is proportional to the shortest arcs subtending the space between the two minimums. The extents of the two maximums are dependent on each other. When a plate (not shown) is made to close the aperture 11 and voltage is applied to the maximum at 180°, this voltage being inversely equal to that applied to the maximum at 0 and inversely equal to that applied to the interior layer (not shown), the deformations of the cylinder in its extension (shown very exaggerated in FIG. 7) cause the plate to tilt about an axis $X_3-X_3$ traversing the cylinder (FIG. 1).

Figure 8:
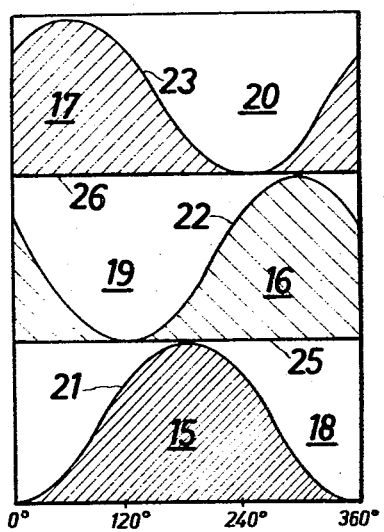
Figure 9:
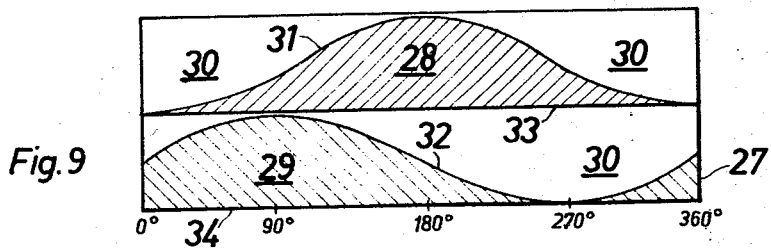

In FIG. 8 the developed shell 14 of a cylinder is lined with electrically conductive partial layers 15, 16 and 17 separated by insulating parts 18, 19 and 20 of the shell 14. The partial layers 15 and 16, 16 and 17, 17 and 15 are staggered 120° relatively to each other on the circumference. The partial layers 15, 16 and 17 are respectively bounded by sinusoidally curved lines 21, 22 and 23 which are so calculated that the areas F enclosed by these lines and respective straight lines 24, 25 and 26, in dependency on the peripheral angle α varying between 0° and 360°, obey the equation $$F(\alpha) = \left| \frac{a}{2} \cdot \cos \alpha - \frac{a}{2} \right|$$

wherein $a$ is the greatest distance apart (amplitude) of the sinusoidal curve and the respective straight line. This equation holds good also for the spread of the layers in FIGS. 1 to 5. It is valid in FIGS. 6 and 7 if the distance on the shortest circumferential line between the minimum is equated to the circumferential angle of 360°. Each of the partial layers 15, 16 and 17 can be subdivided into electrically interconnected separate segments of any desired spread, on the condition that the integral of the segments fulfills said equation. By applying voltages to the partial layers 15, 16 and 17 successively or simultaneously, a plate sprung on the respective cylinder (not shown) and closing an aperture of same can be tilted about three axes displaced 120° relatively to each other and tangent to the cylinder. In FIG. 9, the developed shell 27 of a cylinder is lined with electrically conductive partial layers 28 and 29 staggered 90° relatively to each other and separated by electrically insulating parts 30 of the shell 27. The partial layer 28 is bounded by a sinusoidal line 31 and a straight line 33, and the partial layer 29 by a sinusoidal line 32 and a straight line 34. For the area of each partial layer bounded by a sinusoidal and a straight line, there holds good the equation referred to in connection with FIG. 8.

In FIG. 9, by applying voltages to the layer or layers on the shell of a cylinder (not shown), a plate (not shown) which is cemented to the cylinder and closes an aperture thereof can be tilted about two axes which are at right angles to each other and tangent to the cylinder.

Figure 10:
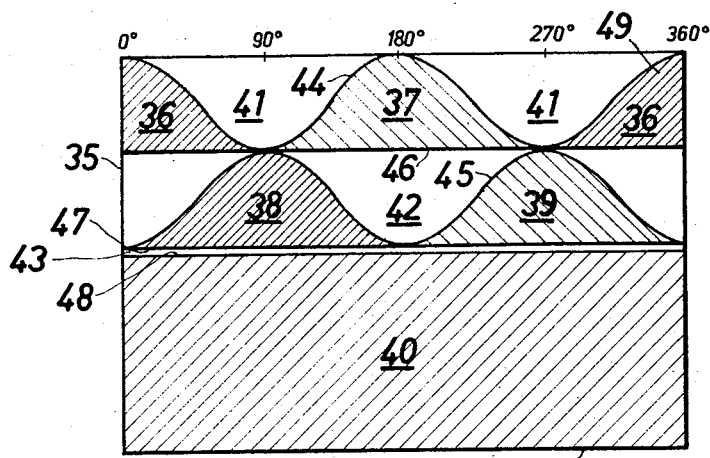

In FIG. 10, the developed shell 35 of a cylinder has a partial layer with two maximums 36, 37, a partial layer with two maximums 38, 39, and an undivided layer 40, separated from each other by insulating parts 41, 42 and 43 of the shell 35. Each of the two partial layers extends over 360°, and both partial layers are staggered 90° relatively to each other. The maximums 36, 37 have a sinusoidal bounding line 44 and a straight bounding line 46. The maximums 38, 39 have a sinusoidal bounding line 45 and a straight bounding line 47. The undivided layer 40 and the insulating part 43 of the shell have a bounding line 48 in common, which is parallel to the circumferential lines 49 and 50 of the apertures of the hollow body.

When voltage is applied to the maximum 36 and an electric field is thus produced which is antiparallel to the direction of polarization of the hollow body, and voltage is applied to the maximum 37 staggered 180° and an electric field is thus produced which is parallel to this direction of polarization, those parts of the shell 35 which are lined with the maximums 36 and 37 are respectively extended and shortened, the values of such extension and shortening at constant voltage depending on the extent of the respective partial layer parallel to the generatrix. This means however that the greatest extension takes place at a circumferential angle of 0°, or 360°, that the greatest shortening takes place at a circumferential angle of 180°, and that there is no deformation in extension at the circumferential angles of 90° and 270°, that is to say at those end points of a diameter of the hollow body which lie in the generatrix containing the points of contact of the lines 44 and 46.

Applying voltages to the maximum 38 and 39 produces an electric field between the maximum 38 and the electrically conductive layer (not shown) on the other side of the shell of the hollow body, this field being anti-parallel to the direction of polarization of the hollow body, and produces an equal electric field between the maximum 39 staggered 180° and the said electrically conductive layer (not shown), this other field being parallel to the direction of polarization of the hollow body, so that the parts of the shell 35 which are lined with the maximums 38 and 39 are deformed in extension in a manner similar to the deformation of the parts lined with the maximums 36 and 37. The greatest extension takes place at a circumferential angle of 90°, the greatest shortening takes place at a circumferential angle of 270°, and there is no deformation in extension at the circumferential angles of 0°, or 360°, and of 180°, that is to say at those end points of a diameter of the hollow body which lie in the generatrix containing the points of contact of the lines 45 and 47.

When the deformations in extension are superposed by the application of corresponding voltages to the partial layers 36, 37 and to the partial layers 38, 39, the position of the point of intersection of the said diameters of the hollow body remains unchanged. Applying voltage to the undivided layer 40 causes the part of the shell which is covered by this layer to be uniformly extended or shortened parallel to the generatrix.

Figure 11:
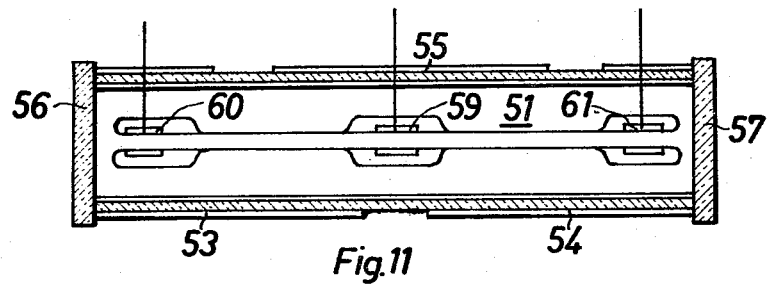
Figure 12:
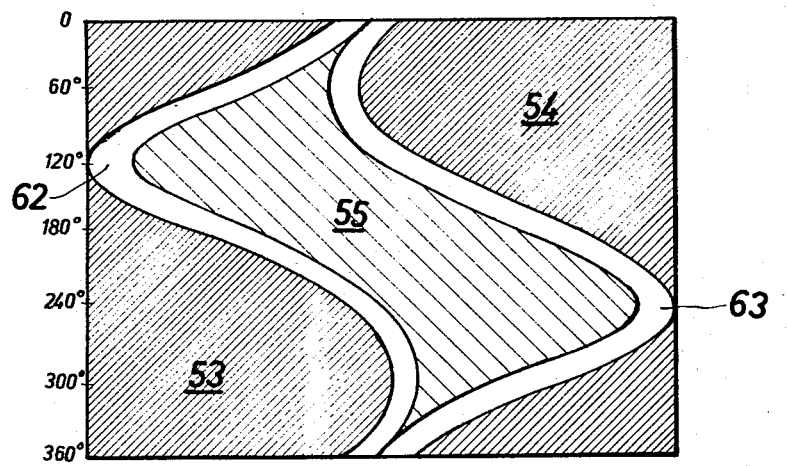
Figure 13:
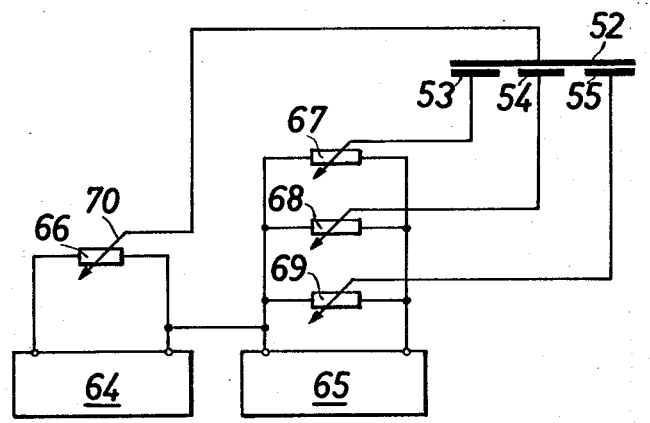

The Fabry-Perot resonator shown in FIGS. 11 and 12 comprises an electrostrictive hollow cylinder 51 the interior surface of which is lined with an electrically conductive layer 52 and the exterior surface of which is lined with a layer divided into three parts 53, 54 and 55 of equal areas. The hollow cylinder 51 is closed by two plane-parallel glass plates 56 and 57, which may be sprung on it and be semi-silvered. The hollow cylinder 51, for example of ceramic material, contains gas and a discharge tube 58 having an annular anode 59 and two annular cathodes 60 and 61. The cylinder 51 may be cooled if necessary.

The partial layers 53, 54 and 55 are separated from each other by two sinusoidal strips 62 and 63 of the cylinder 51. On the left margin of FIG. 12 is a scale for visualizing the circumferential angle $\alpha$. This scale shows that the maximums of the areas of the partial layers 53, 54 and 55 are staggered 120° and lie respectively at 300°, 60° and 180°.

Applying voltage to one partial layer or different voltages to the partial layers causes an alteration of the angle enclosed by the glass plates 56 and 57 and/or alters the distance apart of these plates.

In FIG. 13, two earth-insulated and electronically stabilized high-voltage sources 64 and 65 feed respectively a potentiometer 66 and three parallel-connected potentiometers 67, 68, 69 to which are respectively connected the electrically conductive partial layers 53, 54, 55 on the exterior surface of the hollow body. The electrically conductive layer 52 on the interior surface of the shell is connected to a contact 70 sliding on the potentiometer 66.

The plane-parallel glass plates 56 and 57 are adjusted relatively to each other by applying voltages to the partial layers 53, 54 and 55 through the potentiometers 67, 68 and 69. The potentiometer 66 superposes on these voltages a further voltage which uniformly influences the partial layers 53, 54 and 55 and displaces one or both glass plates 56 and 57, according to how these plates are fixed to the hollow body, but without any change of the angle which these plates enclose. This change in the distance apart of the glass plates can be utilized, for example, for linearizing the different interference orders. If the interference orders are desired to be continuously registered, the contact 70 can be operated by means of a synchronous motor (not shown). It is also possible in known manner to produce automatical changes in the temperature of the hollow body.

In FIG. 14, the shell 71 of a cylinder having a geometrical axis $X_{14}$—$X_{14}$ is lined with a layer 72 covering its entire interior side and with a layer 73 covering its exterior side over the same breadth. The layer 73 is enveloped by an insulating layer 74 and is separated by it from a partial layer 75 which is also electrically conductive and has an extreme value. An insulating layer 76 separates the partial layer 75 from an electrically conductive partial layer 77 having an extreme value. The hollow body, FIG. 14, operates in the manner described with reference to FIGS. 1 to 12.

The invention is not restricted to the illustrated and described quantities of layers used and not to the positions these layers have relatively to each other.

We claim:

1. A hollow body of electrostrictive material having two apertures and comprising at least one plate fast with the hollow body and closing one of said apertures, an electrically conductive layer on its exterior side, an electrically conductive layer on its interior side, each of said two layers extending over the circumference of said hollow body, at least one of said layers having a maximum and a minimum extension parallel to the stright line interconnecting the centers of said apertures.

2. A hollow body of electrostrictive material having two apertures and comprising at least one plate fast with the hollow body and closing one of said apertures, an electrically conductive layer on its exterior side, an electrically conductive layer on its interior side, each of said two layers extending over the circumference of said hollow body, at least one of said layers having two maximum and two minimum extensions parallel to the straight line interconnecting the centers of said apertures, the maximum extent being proportional to the shortest arc interconnecting the two minima over which said maximum bulges.

3. A hollow body of electrostrictive material having two apertures and comprising at least one plate fast with the hollow body and closing one of said apertures, an electrically conductive layer on its exterior side, an electrically conductive layer on its interior side, each of said two layers extending over the circumference of said hollow body, at least one of said layers being divided transversely to the straight line interconnecting the centers of said apertures, at least each partial layer having a maximum and a minimum extension parallel to said stright line, said partial layers being staggered parallel to the circumference of the hollow body.

4. A hollow body of electrostrictive material having two apertures and comprising at least one plate fast with the hollow body and closing one of said apertures, an electrically conductive layer on its exterior side, an electrically conductive layer on its interior side, each of said two layers extending over the circumference of said hollow body, at least one of said layers being divided into parts of equal maximums transversely to the straight line interconnecting the centers of said apertures, at least each partial layer having a maximum and a minimum extension parallel to said straight line, said partial layers being staggered on said straight line at angles equal to the quotient of 360° and the number of partial layers.

5. A hollow body as claimed in claim 4, wherein at least one of said layers comprises three parts of equal areas.

6. A hollow body of electrostrictive matterial having two apertures and comprising at least one plate fast with the hollow body and closing one of said apertures, an electrically conductive layer on its exterior side, an electrically conductive layer on its interior side, each of said two layers extending over the circumference of said hollow body, at least one of said layers being divided transversely to the straight line interconnecting the centers of said apertures, at least each partial layer having two maximum and two minimum extensions parallel to the straight line interconnecting the centers of said apertures, the maximum extent being proportional to the shortest arc interconnecting the two minima over which said maximum bulges, said partial layers being staggered parallel to the circumference of the hollow body.

7. A hollow body of electrostrictive material having two apertures and comprising at least one plate fast with the hollow body and closing one of said apertures, an electrically conductive layer on its exterior side, an electrically conductive layer on its interior side, each of said two layers extending over the circumference of said hollow body, at least one of said layers being divided into two partial layers transverse to the straight line interconnecting the centers of said apertures, at least one of said partial layers having two equal maximum and two equal minimum extensions parallel to the straight line interconnecting the centers of said apertures, said partial layers being staggered 90° parallel to the circumference of the hollow body.

8. A hollow body of electrostrictive material having two apertures and comprising at least one plate fast with the hollow body and closing one of said apertures, electrically conductive layers on the interior and the exterior side of the hollow body, one side of the hollow body being lined with two layers, the one of said layers having at least a maximum and a minimum extension parallel to the straight line interconnecting the centers of said apertures, and the other of said layers extending at equal breadth over the entire circumference of the hollow body.

9. A hollow body of electrostrictive material having two apertures and comprising at least one plate fast with the hollow body and closing one of said apertures, electrically conductive layers on the interior and the exterior side of the hollow body, one side of the hollow body being lined with two layers, the one of said layers being divided transversely to the straight line interconnecting the centers of said apertures, at least each partial layer having at least one maximum and a minimum extension parallel to said straight line, said partial layers being staggered parallel to the circumference of the hollow body, the other of said layers extending at equal breadth over the circumference of the hollow body.

10. A circular hollow body of electrostrictive material having two apertures and comprising at least one plate fast with the hollow body and closing one of said apertures, an electrically conductive layer on its exterior side, an electrically conductive layer on its interior side, each of said two layers extending over the circumference of said hollow body, at least one of said layers being divided transversely to the straight line interconnecting the centers of said apertures, at least each partial layer having at least a maximum and a minimum extension parallel to said straight line, said partial layers being staggered parallel to the circumference of the hollow body, said partial layers being separated from each other by uncovered strips of approximately the same breadth, those bounding lines of said partial layers which are near said apertures being straight lines, the bounding lines between said straight lines being sinusoidal.

11. A hollow body of electrostrictive material having two apertures and comprising at least one plate fast with the hollow body and closing one of said apertures, an electrically conductive layer on its exterior side, an electrically conductive layer on its interior side, each of said two layers extending over the circumference of said hollow body, at least one of said layers being divided, each of said layers extending over the circumference of said hollow body and having maximums and minimums parallel to the straight line interconnecting the centers of said apertures, a voltage source for said undivided layer and a voltage source for said divided layer, said undivided layer being connected to its voltage source by a potentiometer, and each of said divided layers being connected to their voltage source by a potentiometer.

References Cited

UNITED STATES PATENTS

| | | | |
|---|---|---|---|
| 2,540,412 | 2/1951 | Adler | 310—9.6 |
| 2,900,536 | 9/1959 | Dalo | 310—9.6 |
| 2,928,069 | 3/1960 | Petermann | 310—9.6 |
| 3,238,476 | 3/1966 | Borner | 310—9.6 |
| 3,301,936 | 1/1967 | Carman | 310—9.6 |

MILTON O. HIRSHFIELD, *Primary Examiner.*

J. D. MILLER, *Assistant Examiner.*